US006478910B1

(12) United States Patent
Jung

(10) Patent No.: US 6,478,910 B1
(45) Date of Patent: Nov. 12, 2002

(54) METHOD FOR RENOVATING DOORS

(76) Inventor: Horst Jung, Hochstrasse 27, 63128 Dietzenbach (DE)

( * ) Notice: Subject to any disclaimer, the term of this patent is extended or adjusted under 35 U.S.C. 154(b) by 0 days.

(21) Appl. No.: 09/646,894

(22) PCT Filed: Dec. 24, 1998

(86) PCT No.: PCT/EP98/08441

§ 371 (c)(1), (2), (4) Date: Oct. 10, 2000

(87) PCT Pub. No.: WO99/53166

PCT Pub. Date: Oct. 21, 1999

(30) Foreign Application Priority Data

Apr. 9, 1998 (DE) ........................................ 198 16 006

(51) Int. Cl.[7] ................................................ B32B 35/00

(52) U.S. Cl. ......................... 156/94; 156/257; 156/268; 52/784.1; 428/125

(58) Field of Search ................................ 156/256, 257, 156/268, 94; D25/47, 48; 52/455, 456, 784.1; 428/68, 76, 125, 126

(56) References Cited

U.S. PATENT DOCUMENTS 670,939 A * 4/1901 Rapp .......................... 52/713

FOREIGN PATENT DOCUMENTS

| | | | | |
|---|---|---|---|---|
| DE | 1571070 | | 1/1970 | |
| DE | 2549513 A | * | 5/1977 | ........... B29C/27/20 |
| DE | 2549513 | | 5/1977 | |
| DE | 3217370 | | 11/1983 | |
| DE | 3217370 A | * | 11/1983 | ............. E06B/6/72 |
| GB | 1083366 A | * | 1/1970 | ........... B29C/27/14 |

* cited by examiner

*Primary Examiner*—Michael W. Ball
*Assistant Examiner*—John L. Goff
(74) *Attorney, Agent, or Firm*—Dennison, Schultz & Dougherty

(57) ABSTRACT

The invention relates to a method for renovating doors, especially doors with at least one cut-out such as a cut-out for light. Fittings, lock and other salient detachable objects are removed before renovation occurs. The following steps are carried out in order to renovate doors in a problem-free manner and optionally, to add cut-outs of a desired size: the folding side edge of the door is smoothed (periphery of door); a peripheral groove (12) is made in the door fold; the door edges and leaf sides are smoothed; openings in the vicinity of the lock are unstuck; the first side of the door is covered with a covering material (14); the covering materiel is heated; the covering material is secured to the peripheral groove (12) thus created; the door is rotated (10); the second side of the door leaf is covered with covering material, whereupon it is heated and secured to the peripheral groove (12) thus created; the peripheral groove is covered by means of a fat edge banding (18) and said banding (18) is glued to folding side edge areas (20, 22) defining the peripheral groove.

4 Claims, 3 Drawing Sheets

METHOD FOR RENOVATING DOORS

Figure 1:
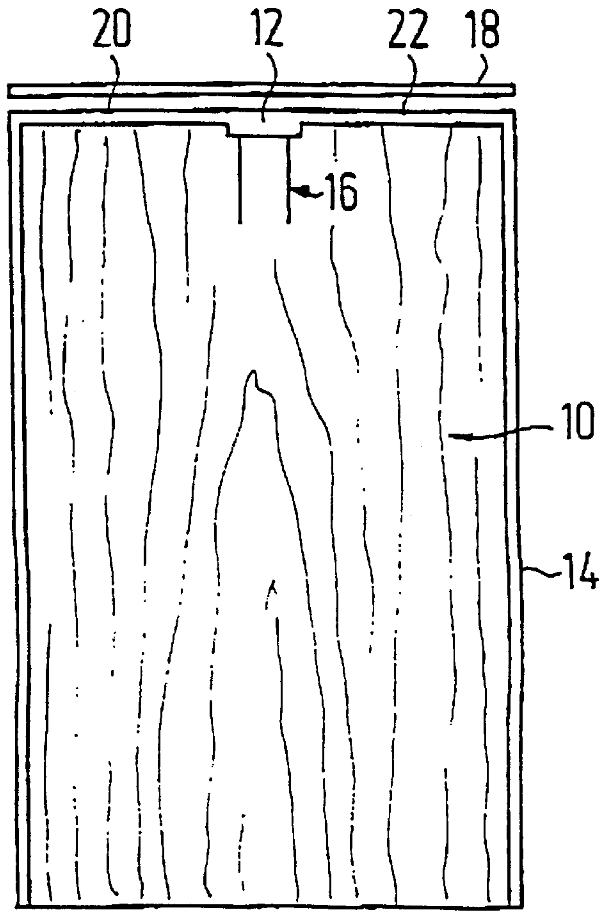

The invention relates to a method for renovating doors, in particular doors with at least one cut-out such as a cut-out for light. Fittings, lock and other projecting, detachable objects are removed before undertaking the renovation.

There are methods known in the art for renovating doors which provide that the door leaf sides are coated with a foil. However, if this is done in a layman-type fashion, the disadvantage can occur in that, due to the overlap of the used foil widths, the material is thicker in the area of the fold. This is optically disturbing and may prevent the door from closing properly.

DE 32 17 370 A1 describes a method for renovating doors which provides that a peripheral groove is brought in place in the door fold of the door to be renovated, also that door edges and door leaf sides are smoothed, that a foil, which is to be used to coat the door, is heated and stretched before it is placed to cover the door leaf side in order for the foil to be fastened subsequently inside the peripheral groove, which in turn is covered up with a groove banding.

To coat a door with foil in accordance with DE-A 25 49 513 the foil is stretched over the door while heated and subsequently fastened inside the peripheral groove using staples.

A method for the tight application of a plastic foil onto a door is known in the art from DE-A 1 571 070; and the foil has allocated heat sources in order to heat the foil allowing it to be stretched according to the invention.

The subject-matter of the current invention is finding a solution for an advanced method for renovating doors, in particular doors with at least one cut-out such as a cut-out for light, that will allow for impeccable results. Using simple steps, the door can be designed in such a way that a desired insert, such as a glass or closed wooden insert, can be integrated even if prior to the renovation the door did not have an insert, or if the door had an insert previously that was larger in terms of size in comparison to the new insert.

According to the invention this objective is achieved by implementing the following process steps:

The folding side edge of the door is smoothed (periphery of the door),

A peripheral groove is put in place in the door fold,

The door edges and door leaf sides are smoothed,

The openings in the vicinity of the lock are pasted over,

One side of the door leaf is coated with a covering material,

Subsequently covering material is heated,

The covering material is fastened inside the peripheral groove that was put in place, The door is turned over, and the second side of the door leaf is coated with the covering material, the covering material is heated and fastened inside the peripheral groove, The peripheral groove is covered with a flat edge banding, and the banding is glued to the folding side edge areas that define the peripheral groove.

Based on the teachings according to the invention the user achieves the advantage that edge strips of the heated covering material can be inserted into the peripheral interior groove during the fastening action, resulting in overlaps of material that almost entirely fill the interior of the groove; in fact, the groove's only purpose consists of securing and receiving the covering material. Consequently, the surface outside of the groove is smooth. The only thing left to do now is to cover the groove with a plane banding which in turn is glued to the edge location of the groove. This step ensures that the renovated door maintains the desired external dimensions in the area of the fold as well, thus guaranteeing the desired functionality. Since the banding is fastened two-dimensionally in the fold area, an attractive exterior appearance is achieved, even if the covering material inside the groove differs in terms of thickness due to the cut off edges.

The invention is particularly noteworthy, because before smoothing the door leaf sides the door cut-out that is already present inside the door is enlarged to a standard size, or a corresponding standard size cut-out is inserted into the door leaf; because this is followed by a milling process which produces a peripheral step on each door leaf side, framing the enlarged cut-out; because a covering is inserted into this frame, that is formed by the step extending all the way around the insert; and because the covering is clipped to generate a cut-out of the desired size; and because cover strips are installed between the inside edges on the side of the cut-out of the covering whose height equals the clear distance between the surfaces of the coverings facing each other; and because the coverings are smoothed in relation to the respective door leaf side as well as in relation to the cut-out; and because subsequently the door leaf sides are coated as described previously with the covering material; and because said covering material is fastened inside the peripheral inside groove as well as on the cover strips after having been clipped in the area of the cut-out. The insert can be e.g. a glass frame, decorative frame, transom frame or a cassette.

Based on the teaching according to the invention, inside a door already containing a cutout this cut-out is specifically enlarged in order for it to be reduced in size so it can provide an attachment for the insert. If a cut-out was not available before in the door that is to be renovated, a corresponding standard cut-out can be integrated and can then be reduced in the manner previously described and equipped with an insert.

The teaching of the invention standardizes the renovation of doors qualifying even persons with little training for the easy renovation of a door. Due to the fact that standard dimensions are taken as the basis for the insert in order to create a cut-out, defective work is precluded for the most part.

Further details, advantages, and characterizing features of the invention can be derived from the claims, the characterizing features, either singly and/or in combination, as well as based on the subsequent description of the preferred embodiments that are depicted in the drawings.

Shown are:

In FIG. 1 a cross section through a door, and in

Figure 6:
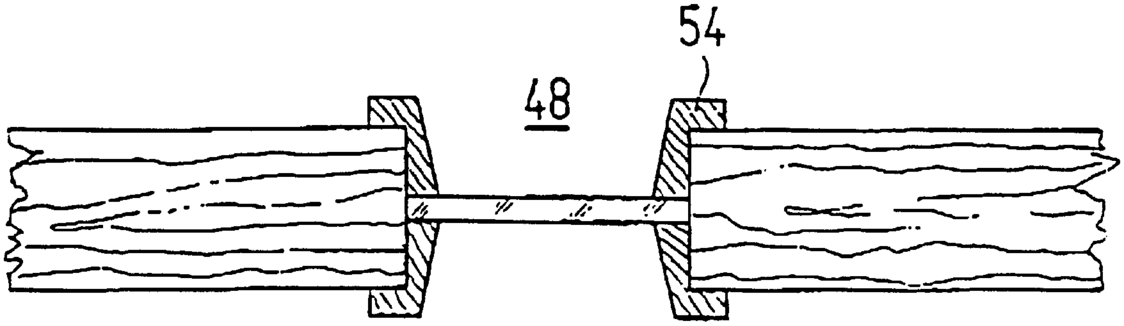
Figure 7:
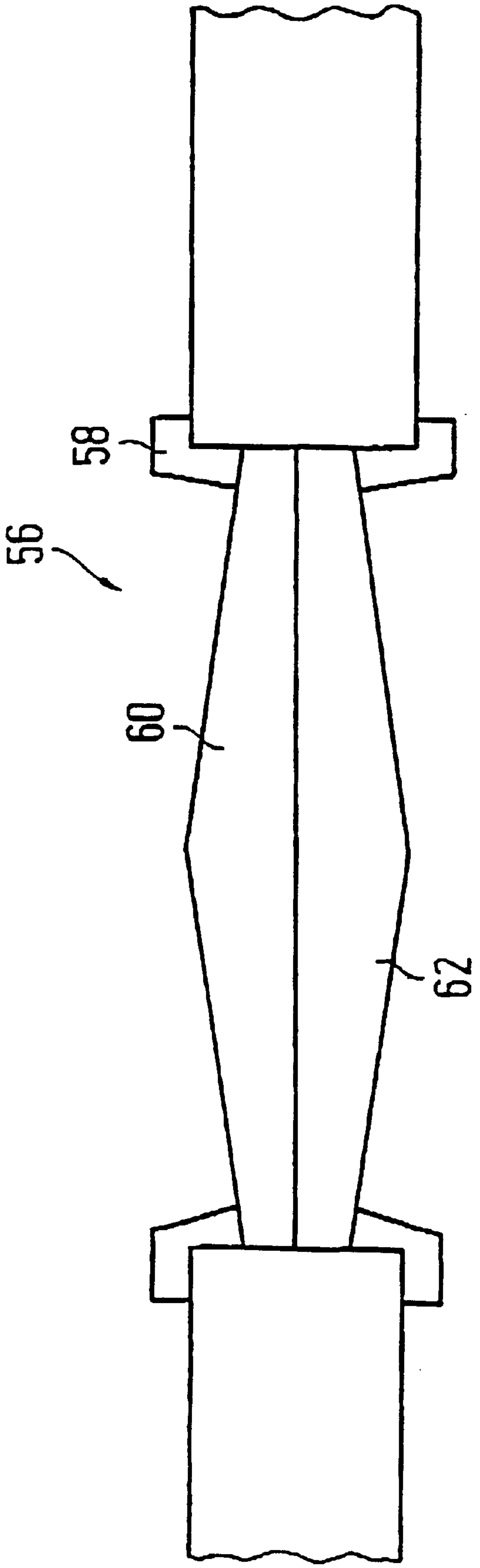

FIG. 2 to FIG. 6 depictions of the principle at work in order to clarify the process steps for renovating a cut-out in a door, and in FIG. 7 a cut-out of a door with cassette insert.

FIG. 1 shows a detail of a cross section through a door 10 which is to be renovated. First, fittings, lock etc. are removed from the door 10. Then the door 10 is smoothed in its periphery, i.e. in its door fold. Subsequently, the peripheral groove is added, which runs in the fold area. In FIG. 1, the corresponding groove is marked with the reference designation 12. Now the door 10 is smoothed, i.e. in the area of the edges as well as with respect to the door leaf sides. The openings that are intended for a lock are covered up. Then one of the door leaf sides is coated with a plastic covering material, with the covering material being fastened in one edge location, subsequently immediately stretched by way of heat application in order to be able to fasten the covering material also on the edge that is opposite to the first edge location; thus, the covering is now fastened on two edge locations that are opposite to each other, in particular the narrower edges. The fastening process per se takes place in the area of the peripheral groove 12, in particular using staples, pins or other suitable materials 16. Specifically, the renovator uses a tacker device to secure the covering material.

Preferably, the covering material is initially stretched between the narrow edges of the door. Then the covering material is stretched along the leaf side of the door and fastened in the longitudinal edge locations. Finally the door is turned over in order to apply the covering material to the opposite door leaf side in the same manner and to subsequently secure it.

After the door leaf sides and the fold area have been coated with the covering material and the covering material has been secured with the staples 16 inside the groove 12, the fold area is covered with a plane banding 18, and the banding 18 is glued in place. Thus, the groove 12 is completely hidden; the groove's only purpose consists in providing a place where the covering material 14 can be fastened with the staples 16 and surplus edge material overlapping beyond the attachment point can be deposited. The groove 12 has an adequate size to house all the necessary material.

Due to the two-dimensional banding 18, glued in place in the adjacent edge locations 20, 22 of the groove 12, it is not noticeable that the door 10 was coated with a plastic covering material, in particular since this plastic material is an optical and structural imitation of the desired type of wood. In addition, it is not important if there are material accumulations inside the groove 12, because the groove 12 houses them completely and the banding 18 in turn completely covers the groove.

Figure 2:
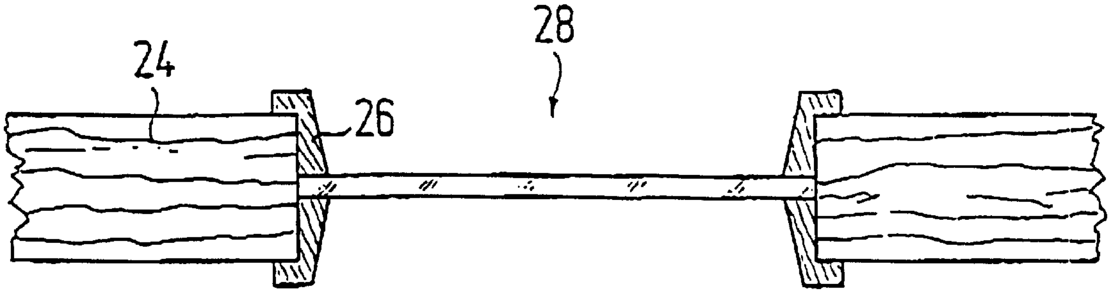
Figure 3:
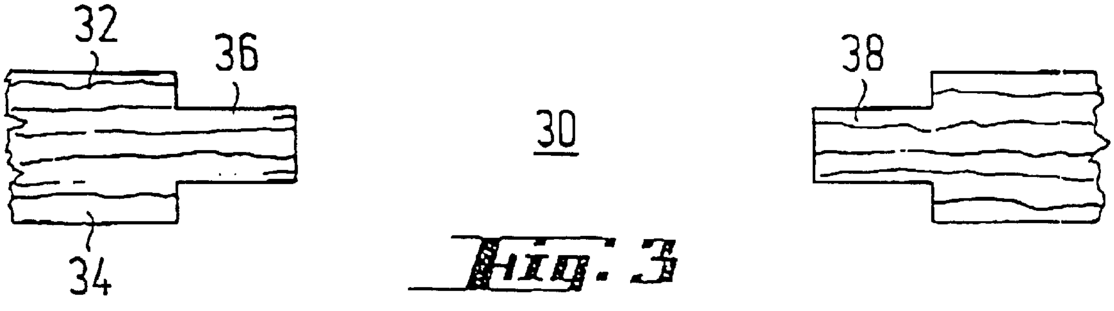
Figure 4:
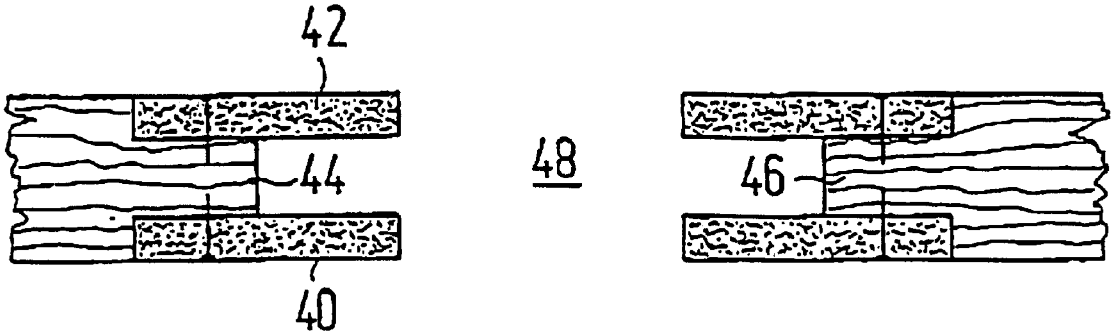
Figure 5:
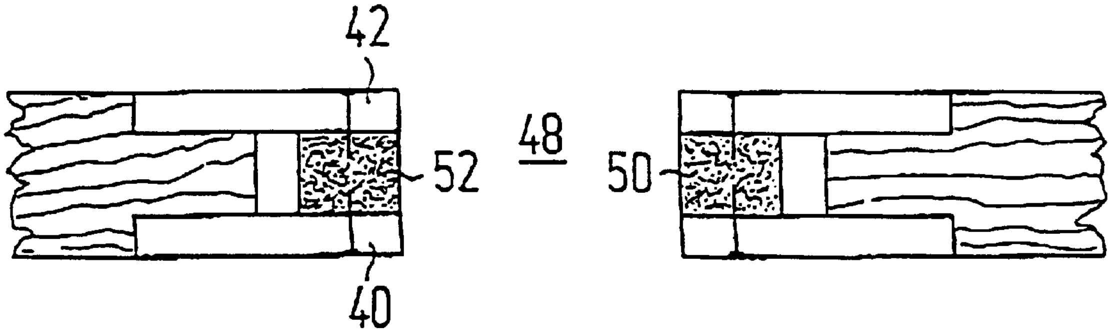

If a door is renovated in the manner described above and the door has a cut-out that is to be replaced with a different cut-out, or if a door is renovated that originally does not have a cut-out but is to receive one, before the covering material is attached in the manner referred to above, the desired cut-out is realized in accordance with the following process steps:

FIG. 2 shows a door 24 with e.g. a cut-out 28 that is closed with an insert such as a glass frame 26. To renovate the door 24 and to realize a new cut-out which is to be filled with a decorative frame, ornamental frame, cassette (FIG. 7) etc., first the insert 26 is removed. Then the cut-out 28 is enlarged according to FIG. 3 resulting is a new cut-out 30 that is now available. By way of a milling action on each side of the door leaf 32, 34 the steps 36, 38, framing the cut-out 30, are obtained which receive in accordance with FIG. 4 respectively one covering 40, 42, preferably such as a particle board covering that extend respectively in a plane direction in relation to each door leaf side. The covering 40, 42 is fastened to the steps 36, 38, i.e. their narrower sections 44, 46 pointing toward the cut-out, by way of nails. If the covering 40, 42 does not have a cut-out as of yet, the cut-out is added using a saw. The reference designation 48 denotes the corresponding cut-outs in FIG. 4.

On the side of the inside edge a surrounding cover strip or parts of strips 50, 52 are inserted between the coverings 40, 42 which, on the one hand, provide the necessary stability and, on the other hand, function as attachment for the covering material. After the cover strips or strips of timbers 48, 50 have been fastened, each of the door leaf sides is smoothed in the usual fashion thus adding and securing the covering material in the manner described previously. Subsequently, any desired insert 54 can be incorporated and mounted into the cut-out 48, such as a decorative frame, transom window, glass pane etc.

As demonstrated in FIG. 7 it is also possible to install a multiple-piece cassette insert 56, if need be, in the cut-out consisting of a peripheral frame 58, which protrudes on the side of the edges over the respective door leaf side in accordance with FIG. 6, and which receives two approximately roof-shaped or double-trapezoid-shaped cassette components 60, 62, preferably realized as identical and wooden, of a wood material or another equally acting material. The cassette inserts 56, 60, 62 generate a depth effect giving the door an optical appearance that is exceedingly attractive and possibly even "heavy."

Before the insert 54, 56 is incorporated and fastened in the respective cut-out 48, the door leaves are renovated, in particular in accordance with the method based on the invention as described in FIG. 1.

If the door that is to be renovated shows signs of wear and tear resulting in holes, indentations etc., these areas are puttied with a knifing glaze in order to achieve a smooth surface along which the covering material can be stretched.

What is claimed is:

1. Method for renovating a door, in particular a door with at least one cut-out, with door fold fittings, locks and other projecting, detachable elements having been removed before the renovation process, wherein, the door cut-out is enlarged to a standard size or a standard size door cut-out is incorporated before the door leaf sides are smoothed;

a peripheral frame is milled around the cut-out into each door leaf side;

a board piece is inserted in the milled frame on each door leaf side;

each board piece is cut to achieve a desired cut-out;

cover strips are inserted along the periphery of the cut-out between the inside edge area of each board piece;

each board piece is smoothed in relation to each door leaf side as well as in relation to the cut-out;

the openings in the vicinity of the lock are pasted over;

one of the door leaf sides is coated with a covering material;

the covering material is heated;

the covering material is fastened inside a peripheral groove that was put in place in the door fold prior to or after the cut out was enlarged;

the door is turned over, then the second door leaf side is coated with the covering material, the covering material is heated and fastened inside the peripheral groove;

the peripheral groove is covered with a flat banding, and the banding is glued to the folding side edge areas that define the peripheral groove, and in the area of the cut-out the covering material is cut and secured to the strips using staples; and, the insert is incorporated into the cut-out and fastened.

2. Method as claimed in claim 1 wherein a transom frame, a glass frame, a decorative frame, a cassette, etc. are used as inserts.

3. Method as claimed in claim 1 wherein the thickness of the used board piece is such that it forms a flush or almost flush transition with the adjacent door leaf side.

4. Method as claimed in claim 1 wherein before smoothing, any indentations on the surface of the door leaf side are puttied with a knifing glaze.

* * * * *